United States Patent [19]

Tatina

[11] 4,092,040

[45] May 30, 1978

[54] ADJUSTABLE TWIST LOCK

[75] Inventor: Richard A. Tatina, Bridgeview, Ill.

[73] Assignee: Portec, Inc., Oak Brook, Ill.

[21] Appl. No.: 727,426

[22] Filed: Sep. 28, 1976

[51] Int. Cl.² ............................................. B62D 23/00
[52] U.S. Cl. .............................. 296/35 A; 105/366 B; 248/503
[58] Field of Search ............................ 296/35 R, 35 A; 248/503; 105/366 B, 465

[56] References Cited

U.S. PATENT DOCUMENTS

| | | | |
|---|---|---|---|
| 3,486,787 | 12/1969 | Campbell | 296/35 A |
| 3,521,845 | 7/1970 | Sweda | 105/366 B |
| 3,586,286 | 6/1971 | Pratt | 105/465 |
| 3,612,466 | 10/1971 | Arnold | 296/35 A |
| 3,682,432 | 8/1972 | Lapaich | 105/465 |
| 3,701,562 | 10/1972 | Carr | 296/35 A |
| 3,737,135 | 6/1973 | Bertolini | 296/35 A |
| 3,866,970 | 2/1975 | Schwiebert | 296/35 A |
| 3,924,544 | 12/1975 | Grau | 296/35 A |
| 3,989,294 | 11/1976 | Carr | 105/366 B |

Primary Examiner—Joseph F. Peters, Jr.
Assistant Examiner—John A. Carroll

Attorney, Agent, or Firm—Hill, Gross, Simpson, Van Santen, Steadman, Chiara & Simpson

[57] ABSTRACT

Adjustable twist lock assembly for locking containers in position on the deck of a flatbed vehicle in which the vehicle has a C-channel extending along each side and opening toward the outside, and the top flange of the channel is at deck level. Each channel has openings in its top flange to accommodate a twist lock to be extended above floor level through a selected opening to enter a container fitting and thereby accommodate the twist lock to containers of varying lengths. The twist lock assembly includes a framework conforming to the inside of the channel and slidable therealong and having an open top to accommodate extension of the twist lock above the channel. The twist lock has an elongated locking head with a depending stud pivotally carried in a lock housing, guided for vertical movement along the framework. A camming member is transversely pivoted to the stud, and a handle, accessible through the C-channel and an opening in the framework, extends from the camming member for manually moving the camming member to cam the lock housing and stud vertically and then turn the camming member and stud at least 90° to lockingly engage the locking head of the twist lock with a container fitting.

10 Claims, 9 Drawing Figures

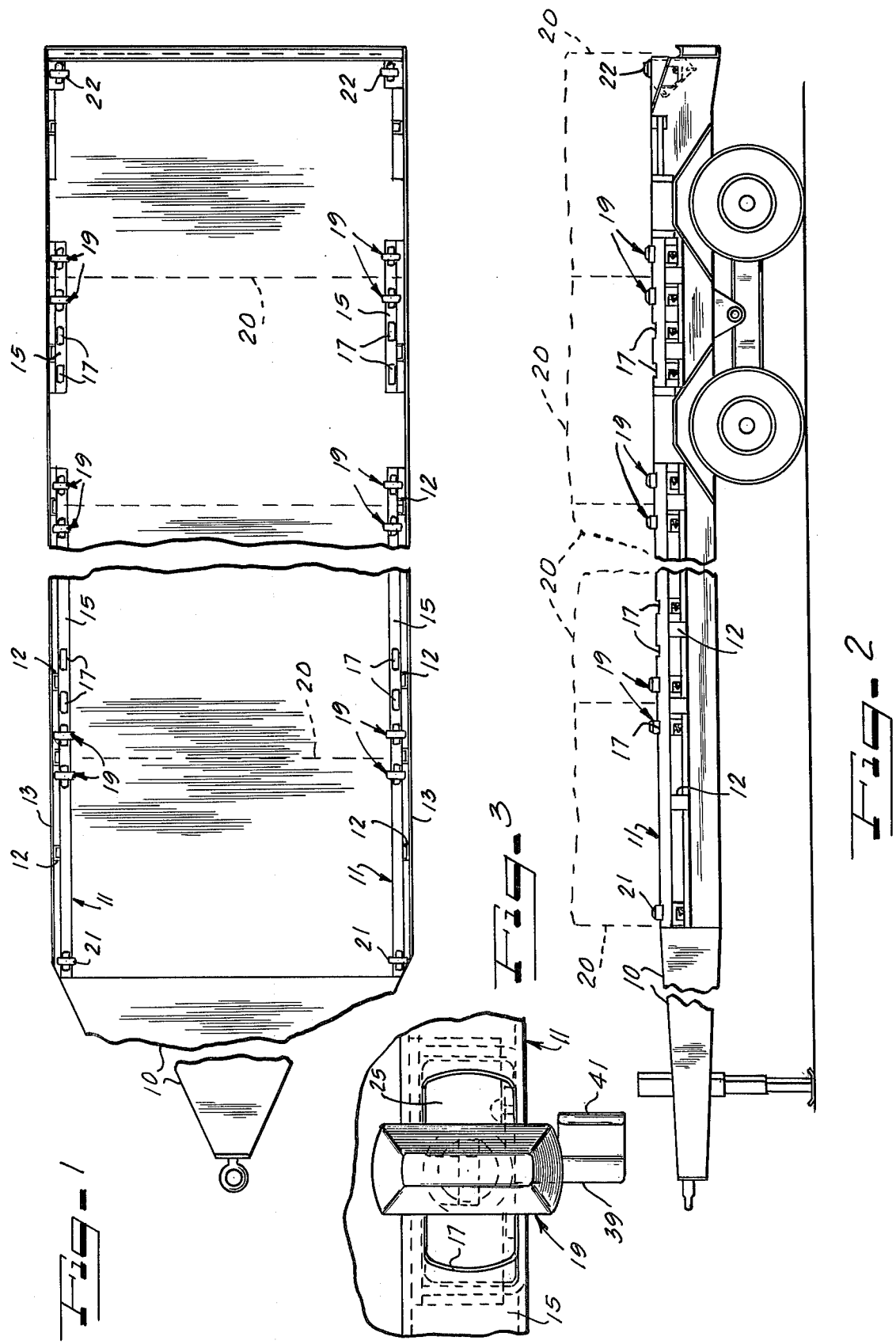

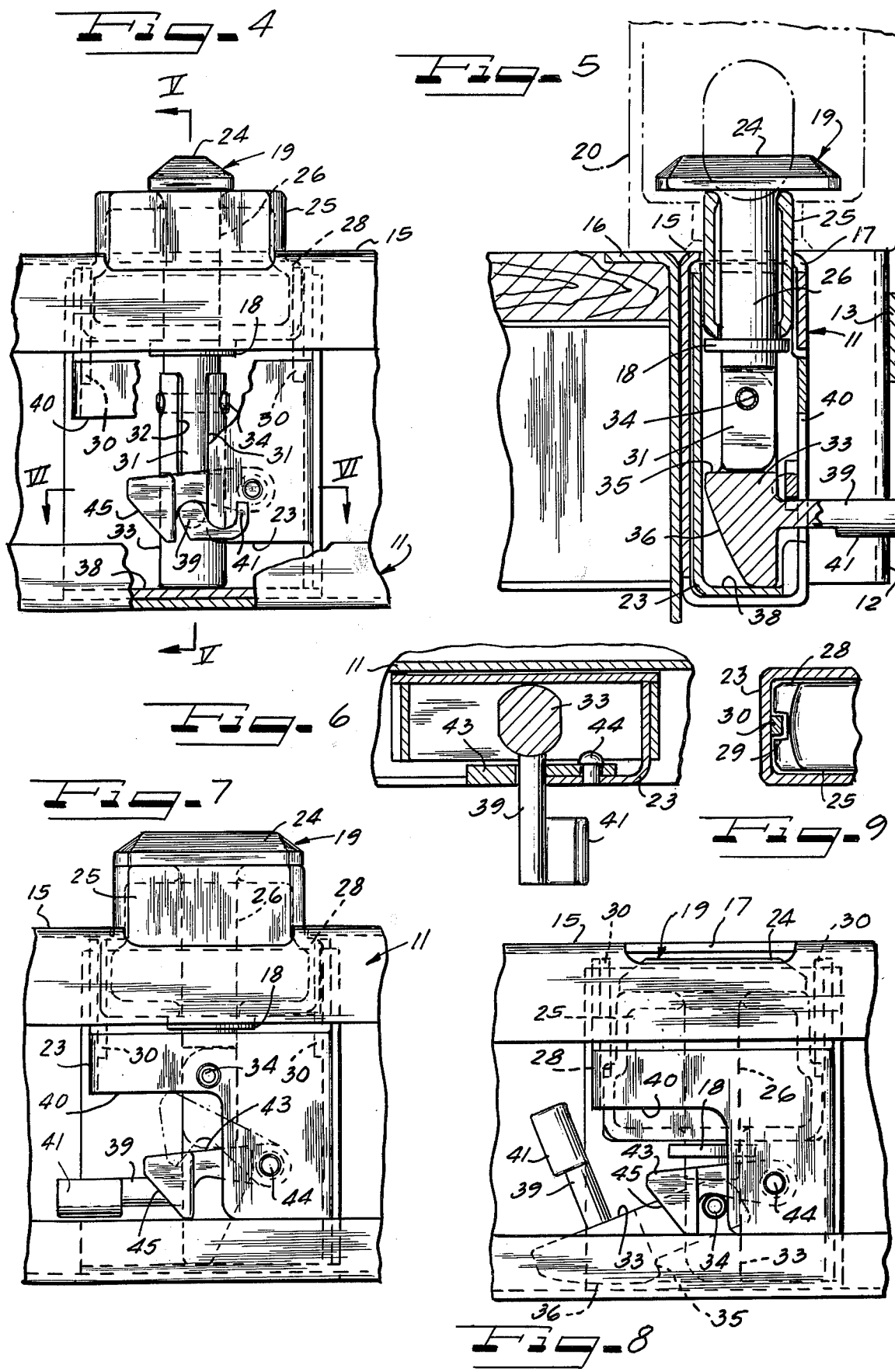

ADJUSTABLE TWIST LOCK

FIELD OF THE INVENTION

Disappearing and longitudinally adjustable twist lock to lockingly engage a container fitting of the type found in Classes 105/366, 248/361 and 296/35.

PRIOR ART AND BACKGROUND OF INVENTION

The U.S. Pat. Nos. to Gutridge et al 3,159,111; Pratt 3,586,286 and Horton 3,768,857 show various forms of locking means for lockingly engaging a container fitting to lock the container on a flatbed vehicle such as a trailer, truck or railway flatcar. The twist locks of the prior art are in position along the vehicle and are not adaptable to lock containers of various lengths on the same vehicle.

SUMMARY AND ADVANTAGES OF THE INVENTION

In carrying out my invention, I provide outwardly opening C-channels on each side of the vehicle in which the top flanges of the channels are substantially flush with the flatbed of the vehicle, and provide these channels with spaced upwardly opening openings therealong to accommodate a twist lock to be selectively moved through one of said openings upwardly into a container fitting and twisted to retain the container fitting to the vehicle. A handle, accessible through the channel and framework, is operable to cam the twist lock vertically and then turn the twist lock about a vertical axis to engage and lock a container fitting to the floor of the vehicle. The foregoing adapts the twist locks to containers of various lengths or to a plurality of containers, it being understood that a plurality of twist locks are positioned in each channel and may be used as selected to enter and lockingly engage a selected container fitting.

An advantage of the invention is to simplify the twist locks heretofore known and render the twist locks selectively adjustable along the length of a flatbed vehicle.

Another advantage of the present invention is the provision of a simplified twist lock assembly adaptable to containers of various lengths for retaining more than one container to the flatbed of a trailer or other transporting vehicle.

A further advantage of the invention is the provision of a simplified form of adjustable twist lock assembly including C-channels extending along opposite sides of a flatbed vehicle with twist locks slidably mounted therein in which the C-channels are so constructed and arranged as to accommodate ready extension of the twist locks at various selected positions along the channels into container fittings, to lock a container to the flatbed of a vehicle.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a fragmentary top plan view of a flatbed vehicle, such as a trailer, illustrating the twist locks spaced therealong and in locking engagement with containers, diagrammatically illustrated by broken lines;

FIG. 2 is a view in side elevation of the flatbed vehicle shown in FIG. 1 illustrating containers spaced therealong by broken lines;

FIG. 3 is a top plan view of a twist lock constructed in accordance with the principles of the present invention showing the twist lock in its C-channel in a vertically extended position and twisted to engage and lock a container fitting in position on a flatbed vehicle;

FIG. 4 is a view in side elevation of the twist lock shown in FIG. 3, showing the twist lock in a locked position in its C-channel;

FIG. 5 is a vertical sectional view taken substantially along line V—V of FIG. 4;

FIG. 6 is a horizontal sectional view taken substantially along line VI—VI of FIG. 4;

FIG. 7 is a view somewhat similar to FIG. 4, but showing the twist lock turned to a released position;

FIG. 8 is a view somewhat similar to FIG. 7, but showing the twist lock locked in its retracted position beneath the top of its C-channel; and FIG. 9 is a partial fragmentary plan view of the twist lock, framework and lock housing, illustrating a form of guide means for the lock housing.

DESCRIPTION OF PREFERRED EMBODIMENT

In the embodiment of the invention illustrated in the drawings, I have shown in FIGS. 1 and 2, a flatbed trailer 10 having C-channels 11 extending along each side thereof and opening to the outside of the trailer. The usual stake pockets 12 are spaced along the outside of the channels. Rub rails 13 extend along the outsides of the stake pockets.

Each C-channel 11 has a top flange 15 flush with the deck of the vehicle. The webs of the channels abut and extend aong side frame members 16, forming side frame members of the vehicle and are suitably secured thereto. The top surface of each C-channel has openings 17 spaced therealong opening through the top flange 15, through which twist locks 19 may be extended to above floor level and then be turned at right angles with respect to the channel after entering a fitting 20 of a container, to retain the container fitting to the deck of the vehicle.

As shown in FIGS. 1 and 2, twist locks 21 may be at one end of the vehicle and held from movement along the vehicle. Twist locks 22 may be at the loading ramp of the vehicle and lowered beneath the loading ramp in a manner which need not be shown or described in detail. The end twist locks 22 are also not adjustably moveable along the vehicle, and when retracted, provide a flush ramp surface. The twist locks 19, however, are adjustably moveable along the channel 11 into alignment with an opening 17 therein, to be elevated through said openings above deck level into a container fitting 20 and then turned from the aligned position shown in FIG. 7 at right angles to said aligned position to lock a container fitting and the container attached thereto to the flat deck of the vehicle.

The twist locks 19 are each carried in a framework 23 slidably mounted within the C-channel 11 for movement therealong. The framework 23 generally conforms to the inner surfaces of the C-channel and has an open top to accommodate the twist lock 19 to be extended thereabove in the position shown in FIG. 7 or to be retractably moved beneath the top flange of the C-channel into the retracted position shown by dotted lines in FIG. 8.

The twist lock includes a locking head 24 tapered inwardly and upwardly at its sides and ends in a manner conventional with such locks and is of substantially the width and length of the upper end portion of a lock housing 25 slidably guided in the framework 23 for extension thereabove. The locking head 24 has a stud 26 depending therefrom and pivotally mounted in said lock housing for movement about a vertical axis to accommodate movement of the locking head 24 into its locked and released positions. A collar 18 on said stud abuts the bottom of said lock housing to raise said lock housing upon vertical movement of said stud and to accommodate camming of said stud and lock housing vertically to extend the locking head 24 and upper end portion of said lock housing above the top 15 of the C-channel 11 through a selected opening 17 in said C-channel.

The lock housing 25 is widened at its lower end portion along opposite ends thereof as indicated by reference numeral 28 to provide channel guides 29 extending along each side of guide ribs 30 (FIG. 9). The guide ribs 30 extend vertically along opposite ends of the framework and cooperate with the guides 29 to guide said lock housing vertically to position the locking head 24 to enter a container fitting 20 and be turned about the axis of the stud 26, to lock the container fitting in position on the deck of a flatbed vehicle.

The portion of the stud 26 depending from the lock housing 25 has flattened opposite sides 31 for receiving a clevis portion 32 of a camming member 33. The camming member 33 is shown as being of a studlike form having a generally shouldered portion 35 extending outwardly therefrom and terminating into a camming surface 36 extending angularly inwardly toward the bottom of said camming member as shown in FIG. 5. Said camming surface is engageable with a bottom surface 38 of the framework 23 to cam the lock housing and twist lock vertically and hold said locking housing and twist lock in the vertically extended locking position shown in FIG. 5.

A handle 39 is shown as extending from the camming member at right angles to the axis of the pivot pin 34, for pivotally moving said camming member to cam the lock housing and twist lock vertically and for turning said camming member and stud to turn the twist lock into the locking position shown in FIG. 5. The handle 39 is accessible through an open portion 40 of the framework, extending along one side and end of said framework and has a hand grip 41 extending laterally therefrom to the outside of said framework to afford ready accessibility to said camming member.

A latch 43 is provided to engage the handle 39 when the locking head and lock housing are in the elevated position shown in FIG. 5, and to lock said lock housing and locking head into its locked position. The latch 43 may have a hook-like end portion heavy enough to drop into engagement with the handle 39 by gravity and is pivotally mounted on the inside of the framework 23 on a pivot pin 44, shown in FIG. 6 as being in the form of a rivet.

Thus, when it is desired to elevate the lock housing 25 and twist lock 19 into the elevated position shown in FIG. 7, it is merely necessary to grasp the hand grip 41 of the handle 39 and pivot the camming member 33 about the axis of the pivot pin 34. The lock housing and twist lock, being elevated, may then be turned about the vertical axis of the stud 26, as the lock housing and twist lock enter a container fitting 20 to pivot the twist lock into its locking position in the fitting as shown in FIG. 5. The latch 43, being elevated, may then drop by gravity or may be manually moved to engage the handle 39 and retain the locking head 24 in its locking position.

The entire twist lock assembly, including the framework 23, may readily be moved along the C-channel 11 when the lock housing and twist lock are in the retracted position shown in FIG. 8 by grasping the lock housing and twist lock through the open portion of the C-channel and moving the lock head of the twist lock into registry with an open portion 17 in the channel registering with a container fitting. Usually, a twist lock at each corner of the container is all that is necessary to retain the container to the vehicle, although the number of twist locks may be increased if desired. The rub rails 13 extending along the outsides of the stake pockets protect the handles 39 should the vehicle move too close to an obstruction.

FIGS. 1 and 2 and the foregoing description clearly disclose how a plurality of containers of different lengths may be mounted on the flatbed of a flatbed trailer and readily locked in position by moving the twist lock assembly along the C-channel into registry with an opening 17 in the top flange of the channel in registry with the container fitting, and that movement of the twist lock assembly along the C-channel and elevating the twist lock assembly into its locking position or lowering the twist lock assembly below deck level may all be attained through the spaces between the flanges of the C-channels in a simplified operation. Moreover, the camming member supports the twist lock and its housing in its elevated position, both when the twist lock is in alignment with the lock housing and turned into its locking position. The camming member further is within the confines of the channel when the twist lock is retracted or elevated in its locking position and the handles 39 are within the confines of the rub rails 13 and are protected by said rub rails during travel of the trailer.

I claim as my invention:

1. In an adjustable twist lock assembly, adjustably moveable along a flatbed container carrying vehicle for locking a container on the vehicle and in combination with a C-channel extending along each side of the vehicle for substantially the length thereof, each channel opening to the outside of the vehicle and having a web, a bottom flange and a top flange having openings spaced therealong to receive a twist lock, each twist lock assembly including a framework conforming to the C-channel and accessible from the outside of said channel for manually moving said framework along said channel into registry with an opening in said top flange, said open framework having an open top to accommodate raising of the twist lock assembly from beneath the top flange of the channel through said opening into position to lock a container to the vehicle, a lock housing guided in said framework for vertical movement along the framework, a twist lock having a depending stud pivotally mounted in said lock housing and extending therebeneath, a camming member transversely pivoted to said stud, and a single lever accessible from the outside of said C-channel for moving said camming member to cam said lock housing and stud vertically and for pivotally moving said camming member and stud to turn said twist lock at least 90° to lockingly engage a container fitting.

2. The adjustable twist lock assembly of claim 1 in which the single lever is in the form of a handle extending laterally from said camming member and accessible through the open portion of said C-channel for pivotally moving said camming member to cam said lock housing and twist lock vertically and for turning said stud and camming member about the vertical axis of said stud to pivotally move said twist lock into a locking position.

3. The adjustable twist lock assembly of claim 2 wherein a latch is provided to engage said handle by gravity and lock said twist lock in a locking position.

4. The adjustable twist lock assembly of claim 3 wherein the latch is pivotally mounted to said framework and is manually releasable to accommodate operation of said handle to turn said twist lock to a release position and to lower said lock housing and twist lock to beneath floor level of the vehicle.

5. The adjustable twist lock assembly of claim 2 wherein the twist lock has an elongated locking head of substantially the width and length of said lock housing and has tapered upper surfaces, tapered inwardly to readily enable said twist lock to engage a container fitting and lock the container in position and in which the open framework has vertical guides on the insides thereof and the lock housing has guideways on opposite sides thereof having guiding engagement with said vertical guides.

6. A locking mechanism for locking containers of varying lengths to the bed of a flatbed vehicle in which the containers have downwardly opeing fittings for receiving the locking mechanism, comprising an outwardly opening C-channel extending along each side of the vehicle each channel having a web extending along a side of the vehicle, a bottom flange extending outwardly of said web and a top flange flush with the flatbed of the vehicle, spaced upwardly opening openings in said top flanges of said C-channels, a plurality of said openings being in vertical alignment with container fittings in accordance with the length of the container, an open framework for each locking mechanism guided for movement along a channel into position beneath a container fitting, each locking mechanism comprising a lock housing guided for vertical movement along said open framework, a twist lock supported on said lock housing and generally conforming to the upper surface thereof when in a release position, a stud depending from said twist lock and pivotally mounted in said lock housing for movement about a vertical axis, means on said stud engaging the bottom of said lock housing for moving said lock housing vertically upon vertical movement of said stud, a camming member transversely pivoted to said stud for moving said stud, lock housing and twist lock vertically and turning said twist lock relative to said lock housing into locking engagement with a container fitting, said camming member supporting said stud in its elevated locking position, and a handle extending from said camming member and accessible through said framework and channel for moving said camming member to cam said lock housing and twist lock vertically and for turning said twist lock about a vertical axis to lockingly engage said twist lock with a container fitting and for holding said lock housing and twist lock in its vertically extended position.

7. The twist lock assembly of claim 6 wherein a latch is pivotally mounted on said framework to engage said handle by gravity and lock said twist lock in a locking position and is manually releasable to accommodate operation of said handle to turn said twist lock to a release position, and to lower said lock housing and twist lock to beneath floor level of the vehicle.

8. The twist lock of claim 7 in which guide means are provided between the framework and lock housing for guiding said lock housing vertically along said framework.

9. The twist lock assembly of claim 8 wherein the guide means comprise guideways on opposite inside end walls of said framework and guide channels on said lock housing having guiding engagement with said vertical guideways.

10. The locking mechanism of claim 6 wherein the handle extends to the outside of said channel when said twist lock has been turned to a locking position, stake pockets are spaced along said channels and extend outwardly of said handle and rub rails extend along the outsides of said stake pockets and form a protective means for said handles when the twist lock is in a locking position.

* * * * *